US005904372A

United States Patent [19]

Ito et al.

[11] Patent Number: 5,904,372

[45] Date of Patent: May 18, 1999

[54] GAS BOMB HOLDING APPARATUS FOR INDUSTRIAL VEHICLE

[75] Inventors: Hiroyuki Ito; Yoshitaka Suzuki, both of Kariya, Japan

[73] Assignee: Kabushiki Kaisha Toyoda Jidoshokki Seisakusho, Aichi-ken, Japan

[21] Appl. No.: 08/979,765

[22] Filed: Nov. 26, 1997

[30] Foreign Application Priority Data

Nov. 28, 1996 [JP] Japan .................................... 8-318014

[51] Int. Cl.[6] .................................. B60P 3/22; B66F 9/06

[52] U.S. Cl. .......................... 280/834; 280/830; 280/831; 187/222

[58] Field of Search .................................... 280/830, 831, 280/832, 833, 834, 220; 187/222, 223, 224, 225

[56] References Cited

U.S. PATENT DOCUMENTS 4,025,080 5/1977 Gedeon .................................. 280/5 A 5,634,665 6/1997 Jung ........................................ 280/834

FOREIGN PATENT DOCUMENTS 64-35125 3/1989 Japan .

5-112144 5/1993 Japan .................................... 280/830

*Primary Examiner*—Lanna Mai

*Assistant Examiner*—Jeff Restifo

*Attorney, Agent, or Firm*—Woodcock Washburn Kurtz MacKiewicz & Norris, LLP

[57] ABSTRACT

A gas bomb holding apparatus for industrial vehicles contains a holding device disposed on a rear portion of a vehicle for holding a gas bomb such that it is laid. The holding device includes a receiving stand for supporting a gas bomb and arm members mounted rotatably around a shaft in a cross direction of the vehicle for holding the gas bomb between the receiving stand and the arm members. This holding device has a rear end indicating member for indicating a rear end position of the vehicle to be visually confirmed by a driver. The driver can confirm the rear end position of the vehicle by means of the rear end indicating member.

8 Claims, 8 Drawing Sheets

GAS BOMB HOLDING APPARATUS FOR INDUSTRIAL VEHICLE

BACKGROUND OF THE INVENTION

1. Field of the Invention

This invention relates to a gas bomb holding apparatus for use on an industrial vehicle such as fork lift, for mounting a gas bomb filled with liquefied petroleum gas for fuel use on a top of the vehicle.

2. Description of the Related Art

Because a conventional type fork lift is not capable of securing a space for incorporating a gas bomb therein, generally according to the prior art, the gas bomb is mounted on a rear portion thereof in the form of outside mounting. A gas bomb holding apparatus for use in mounting the gas bomb is mounted on a top face of rear pillars of a head guard or a counterweight. The gas bomb is supported by a cradle such that it is laid in a cross direction of the vehicle and held by tightening its band member.

However, in the case of a fork lift which holds the gas bomb in the rear portion thereof in the form of outside mounting, a backward view is hindered by the gas bomb so that a rear end of the counterweight which provides a visual criterion as a rear end of the vehicle cannot be confirmed easily or at all by a fork lift driver. As a result, the confirmation of a position of the rear end of the vehicle must depend solely on the driver's sense, thereby providing an obstacle to effective operation thereof avoiding an interference with surrounding walls or goods in a limited narrow working space.

SUMMARY OF THE INVENTION

Accordingly the present invention has been proposed to solve the above problem, and it is an object of the present invention to provide a gas bomb holding apparatus for an industrial vehicle which allows a driver to visually confirm a rear end position of the vehicle while holding a gas bomb.

According to the present invention, there is provided a gas bomb holding apparatus for an industrial vehicle comprising: a holding device disposed on a rear portion of the industrial vehicle for holding a gas bomb such that it is laid; and a rear end indicating member provided on the holding device to be visually confirmed by a driver for indicating a rear end position of the vehicle.

The driver can confirm the rear end position of the vehicle by means of the rear end indicating member. Therefore, during a transportation work in a limited narrow space, the transportation work can be effectively carried out while avoiding a collision of the rear end of the vehicle with a wall surface or the like particularly at the time of backward traveling or turning.

As the rear end indicating member, an operating handle, a bracket, a number stay bracket or the like, mounted on the holding device can be used.

The holding device can be mounted such that it is rotatable in the backward and forward direction around a shaft provided in a cross direction of the vehicle or mounted to one of rear pillars of a head guard such that it is horizontally rotatable.

If the rear portion of the vehicle is formed of a counterweight and the rear end indicating member is disposed slightly forward of the rear end surface of the counterweight, even when the rear portion of the vehicle collides with a wall or the like, the counterweight strikes the wall or the like ahead of the rear end indicating member, so that the rear end indicating member is prevented from being damaged.

DETAILED DESCRIPTION OF THE PREFERRED EMBODIMENTS

Hereinafter, an embodiment of the present invention will be described with reference to the accompanying drawings.

First embodiment

Figure 1:
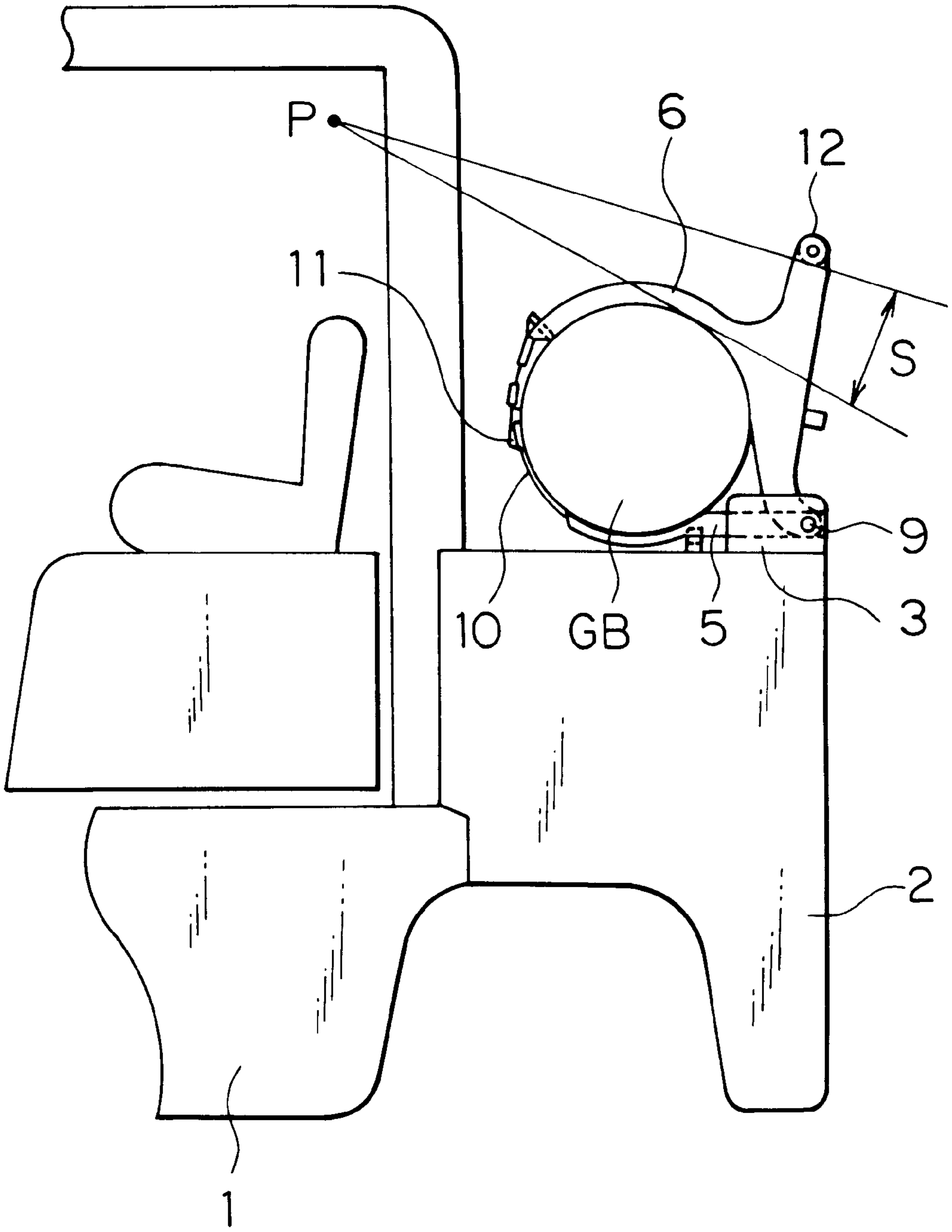
FIG. 1 is a partial side view showing schematically a fork lift equipped with a gas bomb holding apparatus according to a first embodiment of the present invention.
Figure 2:
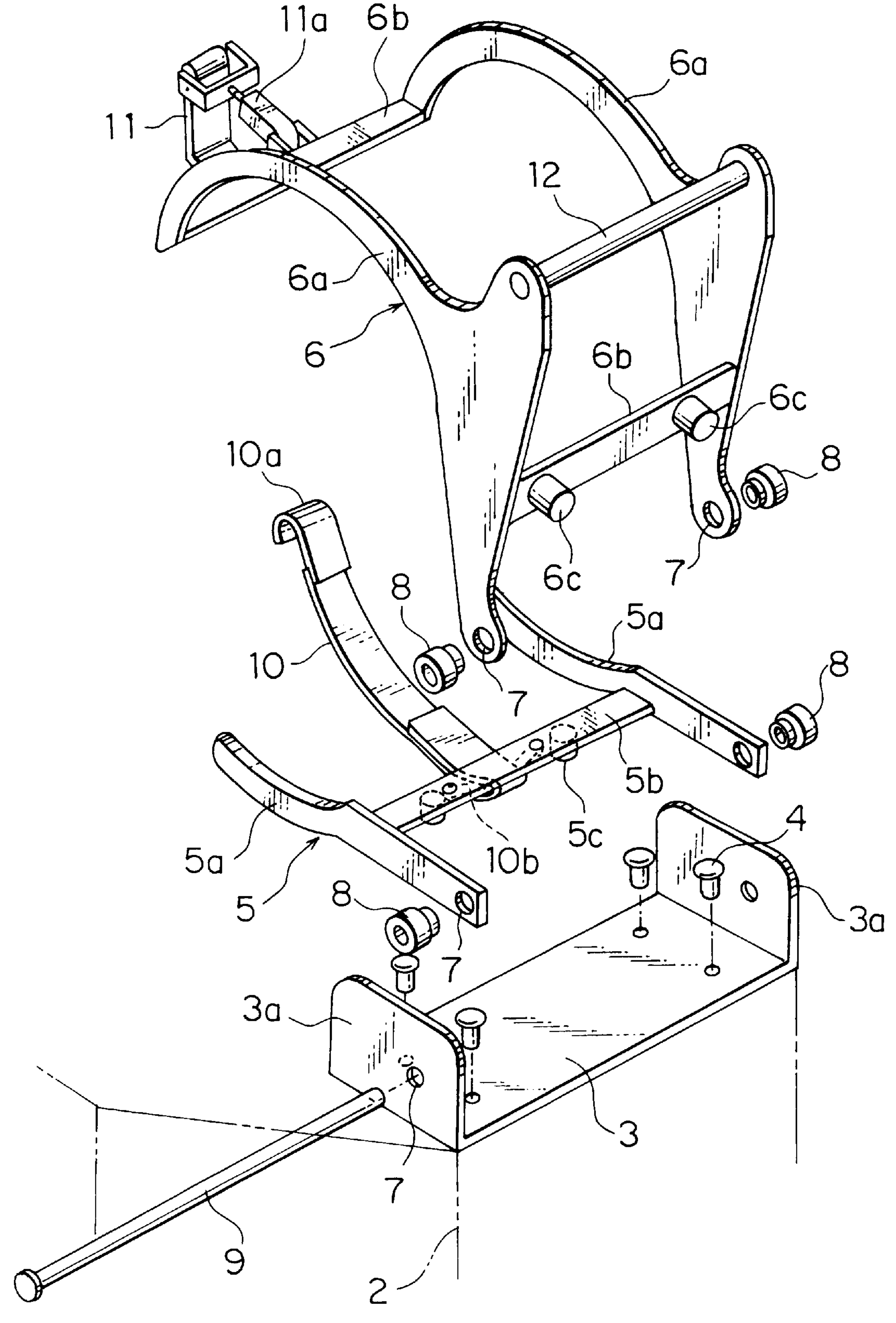
FIGS. 2 and 3 are a disassembly perspective view and an assembly perspective view of the gas bomb holding apparatus according to the first embodiment, respectively.

As shown in FIG. 1, a gas bomb holding apparatus according to a first embodiment of the present invention is mounted on a top face of a counterweight 2 provided in the rear of a forklift 1. The counterweight 2 forms a rear portion of the forklift and, as shown in FIG. 2, a base plate 3 having riseup plates 3*a* on both sides thereof is fixed to the top face of the counterweight 2 by means of bolts 4. A receiving stand 5 and an arm member 6 are disposed on the base plate 3 for supporting a gas bomb GB therebetween such that it is laid.

The receiving stand 5 for supporting the gas bomb GB from down side is disposed inside the riseup plates 3*a*. The receiving stand 5 comprises right and left receiving plates 5*a* each formed in arc shape as a receiving face for the gas bomb GB and a connecting plate 5*b* for connecting the receiving plates 5*a* to each other. The arm member 6 for pressing the gas bomb GB from upward is disposed inside the receiving plates 5*a* on the right and left of the receiving stand 5. The arm member 6 comprises right and left pressing plates 6*a* each formed in arc shape and connecting plates 6*b* for connecting the pressing plates 6*a* to each other.

Figure 3:
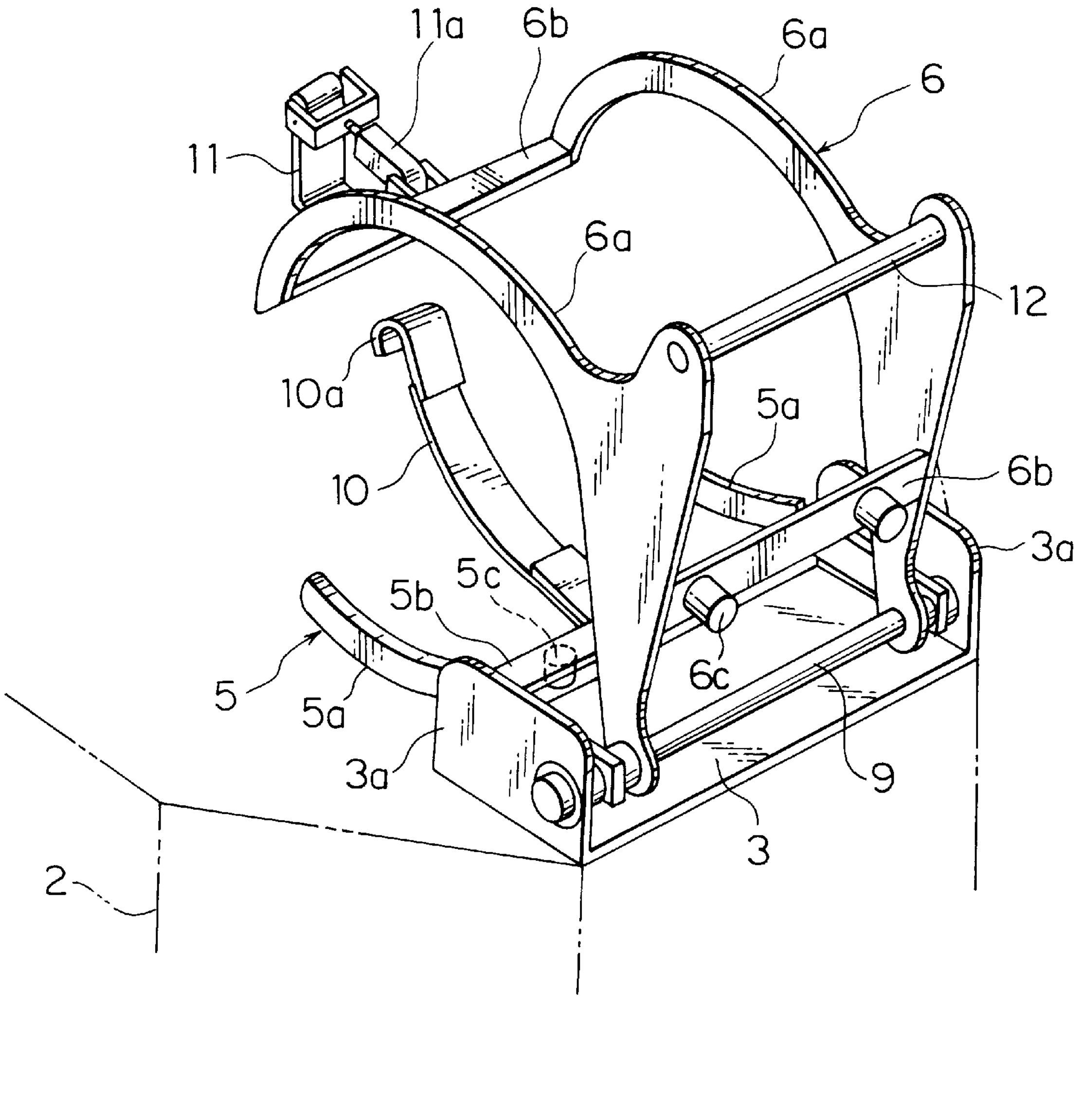

The receiving stand 5 and arm member 6 are individually rotatable in the forward and backward direction around a common lateral shaft with respect to the rear ends of the riseup plates 3*a* of the base plate 3. Through holes 7 are made in rear end portions of the riseup plates 3*a* on the base plate 3, rear end portions of the receiving plates 5*a* of the receiving stand 5 and proximal end portions (lower end portions) of the pressing plates 6*a* of the arm member 6. With the through holes 7 matching each other, a lateral supporting shaft 9 is inserted through those through holes 7 with spacers 8 interposed between the respective plates and processed not so as to loose out so that those plates are assembled as shown in FIG. 3.

The receiving stand 5 is supported on a gas bomb mounting position such that supporting legs 5*c* made of rubber provided on a bottom face of the connecting plate 5*b* make contact with a top face of the counterweight 2. The receiving stand 5 is fixed by a stopper pin type locking mechanism (not shown) which is provided on one of the riseup plates 3*a* of the base plate 3 and engageable with the corresponding receiving plate 5*a* of the receiving stand 5.

Figure 4:
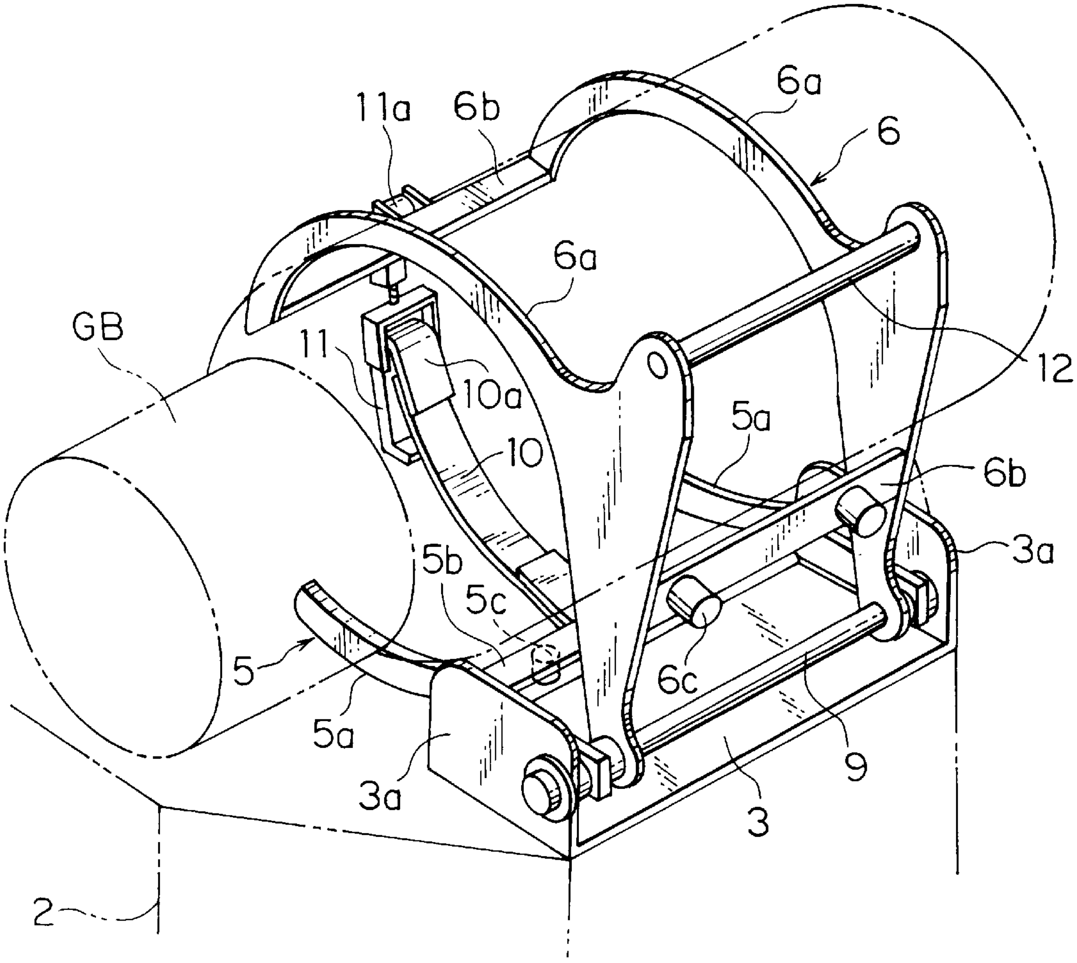
FIG. 4 is a perspective view of the gas bomb holding apparatus currently holding a gas bomb.

As shown in FIG. 4, the gas bomb GB is held from up and down between the receiving stand 5 and the arm member 6. Although FIG. 4 shows a case in which receiving faces of the receiving plates 5*a* of the receiving stand 5 and supporting faces of the pressing plates 6*a* of the arm member 6 are constructed so as to coincide with an external circumference of the gas bomb GB, it is desirable to hold the external surface of the gas bomb GB by three points, that is, two points of each receiving plate (forward/backward) 5*a* of the receiving stand 5 and one point at a front end of each pressing plate 6*a* of the arm member 6. At this time, a gas bomb having a different diameter can be held so that general purpose efficiency for different diameter gas bombs is improved.

A fixing means for fixing the arm member 6 to the receiving stand 5 is provided between the receiving stand 5 and the arm member 6. A proximal end of this fixing means is attached to the connecting plate 5*b* through a bracket 10*b*. This fixing means comprises a tightening belt 10 having an engaging metal 10*a* at a tip thereof and a tightening metal 11 which is rotatably attached to the connecting plate 6*b* located at a front end of the arm member 6 through the pivoting member 11*a*. After the engaging metal 10*a* of the tightening belt 10 is engaged with the proximal end of the tightening metal 11, the tightening metal 11 is rotated so that the arm member 6 is fixed to the receiving stand 5. By rotating the tightening metal 11 in an opposite direction, the arm member 6 can be removed from the receiving stand 5.

Figure 5:
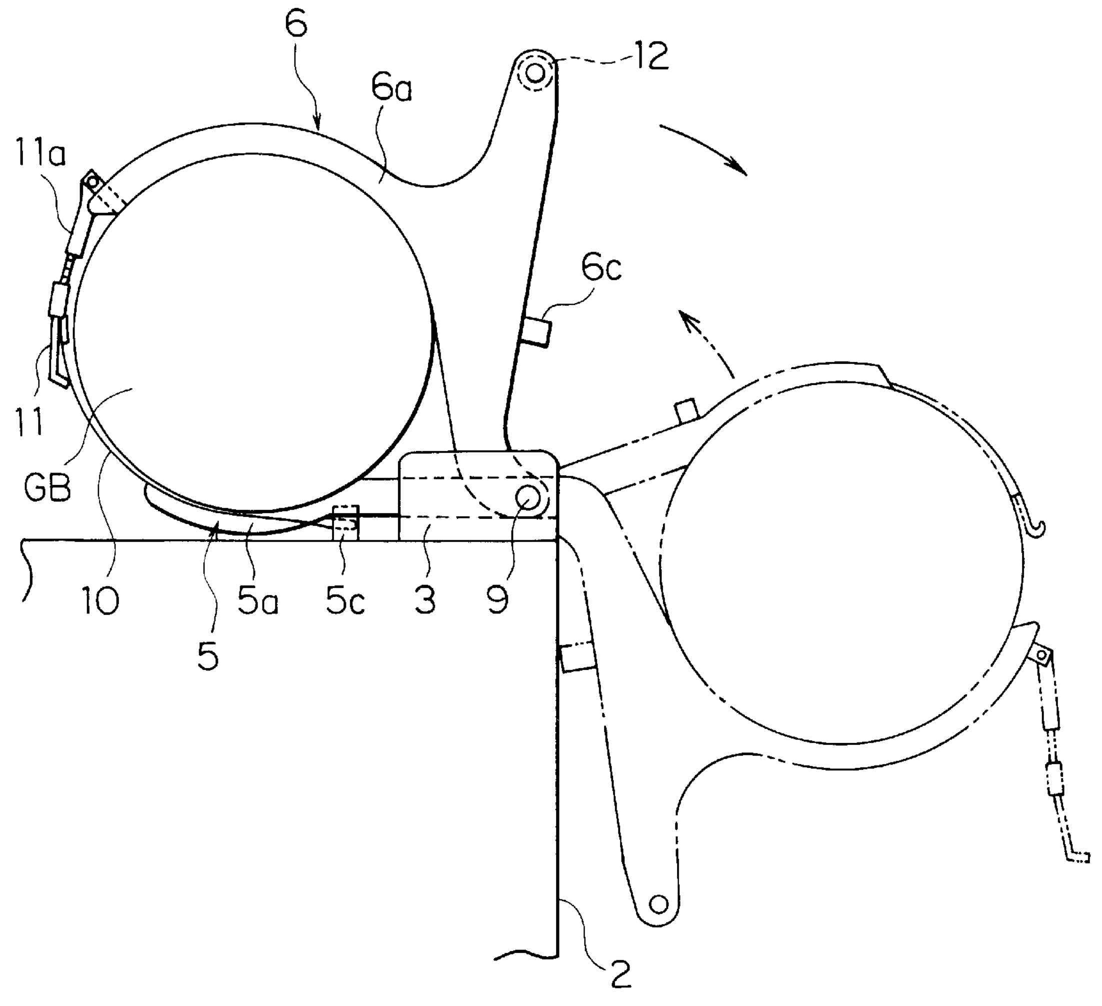
FIG. 5 is a side view showing the gas bomb holding apparatus which is rotated between a bomb holding position and a bomb replacement position.

As shown in FIG. 5, the receiving stand 5 and the arm member 6 assembled in the above described manner can be displaced together with the gas bomb GB to the rear of the counterweight 2 after the lock on the receiving stand 5 is released. Consequently, the gas bomb GB can be replaced at a position (hereinafter referred to as gas bomb replacement position) lower than the gas bomb mounting position. After the arm member 6 is rotated to the gas bomb replacement position, a maximum rotation angle thereof is restricted because cushion stoppers 6*c* made of rubber provided on the connecting plate 6*b* on the proximal end of the arm member 6 make contact with the rear face of the counterweight 2.

The gas bomb holding apparatus having the aforementioned structure is ordinarily located at the gas bomb mounting position on the counterweight 2, as shown in FIG. 4, such that the gas bomb GB is held between the receiving stand 5 and the arm member 6. When the gas bomb GB is replaced with new one, the lock on the receiving stand 5 is released by operating the locking mechanism, and the arm member 6 and the receiving stand 5 are rotated together with the gas bomb GB to the rear of the counterweight 2 which is the gas bomb replacement position, as shown in FIG. 5. Then, the fixing between the tightening belt 10 and the tightening metal 11 is released, and in a state that the receiving stand 5 is returned to the counterweight 2 side, the gas bomb GB is unloaded and replaced with a new gas bomb filled with gas.

Because the gas bomb GB can be displaced to a position lower than the gas bomb mounting position on the counterweight 2 for the replacement thereof, the replacement work can be easily carried out. After the replacement of the gas bomb GB is completed, the tightening belt 10 and the tightening metal 11 are fixed to each other so as to fix the arm member 6 to the receiving stand 5. After this, the arm member 6 and the receiving stand 5 are rotated together with the gas bomb GB forward so that they are returned to the gas bomb mounting position and the receiving stand 5 is locked to the base plate 3 by means of the locking mechanism.

When the gas bomb GB is mounted on the gas bomb holding apparatus installed on the counterweight 2 as shown in FIG. 1, a backward view of a driver from a viewpoint P thereof is hindered by the gas bomb GB. That is, the rear end of the counterweight 2 is hidden by the gas bomb GB so that it cannot be confirmed with the eyes of the driver. To solve such a problem, according to this embodiment, rear ends of the right and left pressing plates 6*a* of the arm member 6 are extended backward and upward, such that an end of each extension is matched with an extensional vertical line of the rear end of the counterweight 2. Further, between the ends of the extensions an operating handle 12 for operating the arm member 6 is provided so as to form a rear end indicating member for indicating a rear end position of the forklift. In this case, the ends of the extensions of the pressing plates 6*a* and the operating handle 12 are preferred to be disposed slightly inside the rear end surface of the counterweight 2.

Thus, upon transportation work, the driver can confirm the rear end position of the counterweight 2 by using as a visual criterion the operating handle 12 of the arm member 6 which acts as the rear end indicating member. Therefore, even if the working space is limited, the driver can effectively carry out transportation work while avoiding a collision of the rear end of the counterweight 2 with a wall or good. Further, according to this embodiment, because the operating handle 12 is located higher than a top face of the gas bomb GB and a gap S is formed between the handle 12 and gas bomb GB, deterioration of the backward view due to an existence of the operating handle 12 is prevented.

On the other hand, the operating handle 12 is used for rotating the arm member 6 together with the gas bomb GB upon the replacement of the gas bomb GB. Because the operating handle 12 is located upward of the rear end face of the counterweight 2, a sufficient distance from a rotational center of the arm member 6 is assured and a direction of a force applied when the arm member 6 is rotated can be horizontal or obliquely downward, thereby the rotation procedure up to the gas bomb replacement position can be easily carried out.

Further, because in this embodiment the operating handle 12 of the arm member 6 acts as the rear end indicating member at the same time, as compared to a case in which the rear end indicating member is constructed with different members not related to the gas bomb holding apparatus, the production thereof is easier with less parts, production cost is reduced and there is no such problem that the operating handle may obstruct a rotation of the gas bomb GB to the bomb replacement position. Further, if the operating handle 12 is disposed slightly inside the rear end surface of the counterweight 2, when the rear of the forklift collides with a wall or the like, the counterweight 2 strikes ahead of the operating handle 2 to protect the operating handle 12 from being damaged.

Second embodiment

Figure 6:
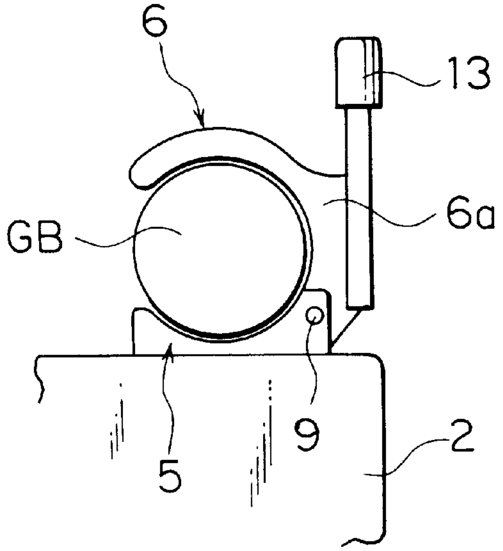
FIGS. 6 and 7 are a schematic side view and a plan view of a gas bomb holding apparatus according to a second embodiment, respectively.
Figure 7:
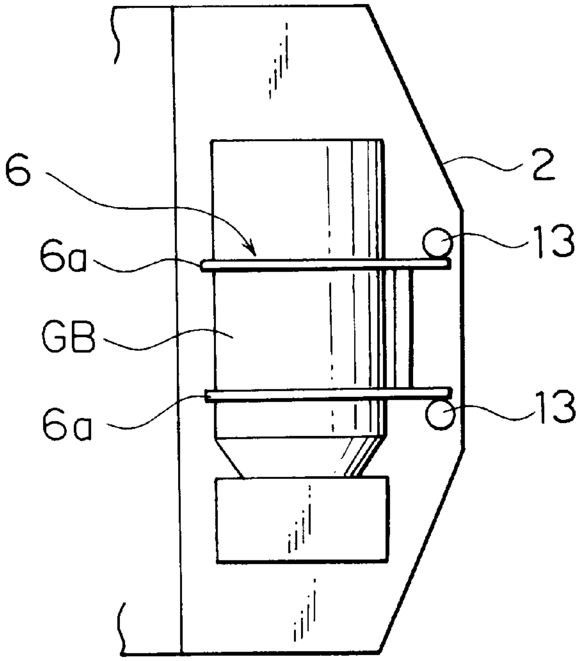

A gas bomb holding apparatus according to a second embodiment of the present invention will be described with reference to FIGS. 6 and 7. A pole like operating handle 13 stands upright at the rear end portion of each pressing plate 6*a* of the arm member 6 along an extensional vertical line of the rear end of the counterweight 2 to form rear end indicating members for indicating the rear end of the counterweight 2. Although FIGS. 6 and 7 roughly show the construction of the gas bomb holding apparatus, the structures of the remaining portions other than the handles 13 are the same as those of the first embodiment described previously.

Therefore, according to this second embodiment, like the first embodiment, the driver can effectively carry out transportation work by confirming the rear end position of the counterweight 2 using the operating handle 13 acting as the rear end indicating member at the same time, as a visual criterion. Further, during replacement of the gas bomb GB, the arm member 6 and the receiving stand 5 can be rotated together with the gas bomb GB between the bomb mounting position and the bomb replacement position by using the operating handle 13.

Third embodiment

Figure 8:
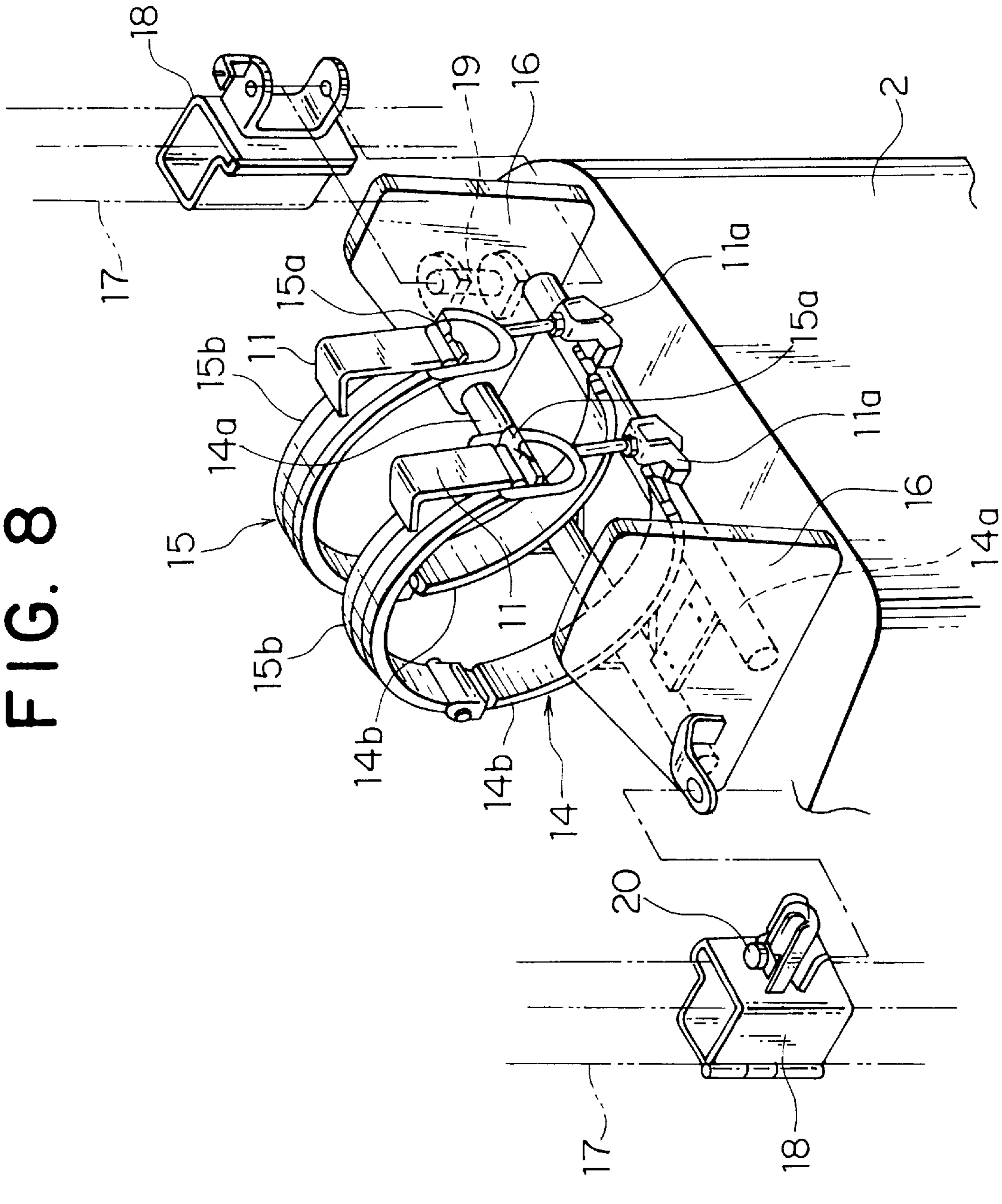
FIGS. 8 and 9 are perspective views showing gas bomb holding apparatus according to third and fourth embodiments, respectively.

A third embodiment of the present invention will be described with reference to FIG. 8. This embodiment shows a case in which the present invention is applied to a swing type gas bomb holding apparatus to be mounted on a rear pillar 17 of a head guard. In the gas bomb holding apparatus of such a type, a receiving stand 14 comprises front and rear rods 14*a* extending horizontally to the right and left with respect thereto and right and left semi-ring shaped receiving plates 14*b* fixed onto the rods 14*a*. Arm members 15 are formed of right and left semiring shaped pressing plates 15*b* fixed rotatably to ends of the respective receiving plates 14*b* and having hooks 15*a* on the tips thereof. Further at the other end of each receiving plate 14*b* is mounted rotatably a tightening member 11 through a pivoting member 11*a* for fixing the pressing plate 15*b* to the receiving plate 14*b* by engaging with the hook 15*b*.

On the right and left end portions of the aforementioned rods 14*a* are fixed brackets 16. One of the brackets 16 is horizontally rotatably attached to a mounting metal 18 fixed to the rear pillar 17 through a swing pin 19 and the other bracket 16 is mountable onto a mounting metal 18 fixed to the other rear pillar 17 through a stopper pin 20. According to such a structure, the receiving stand 14 is horizontally rotatable between the bomb mounting position above the counterweight 2 and the bomb replacement position which is protruded to the side of the forklift.

According to the third embodiment, in the above described swing type gas bomb holding apparatus, the aforementioned right and left brackets 16 are extended backward and upward so as to be enlarged. The top of the rear end of each bracket 16 is matched with an extension line of the rear end surface of the counterweight 2 so as to form the rear end indicating member.

Fourth embodiment

Figure 9:
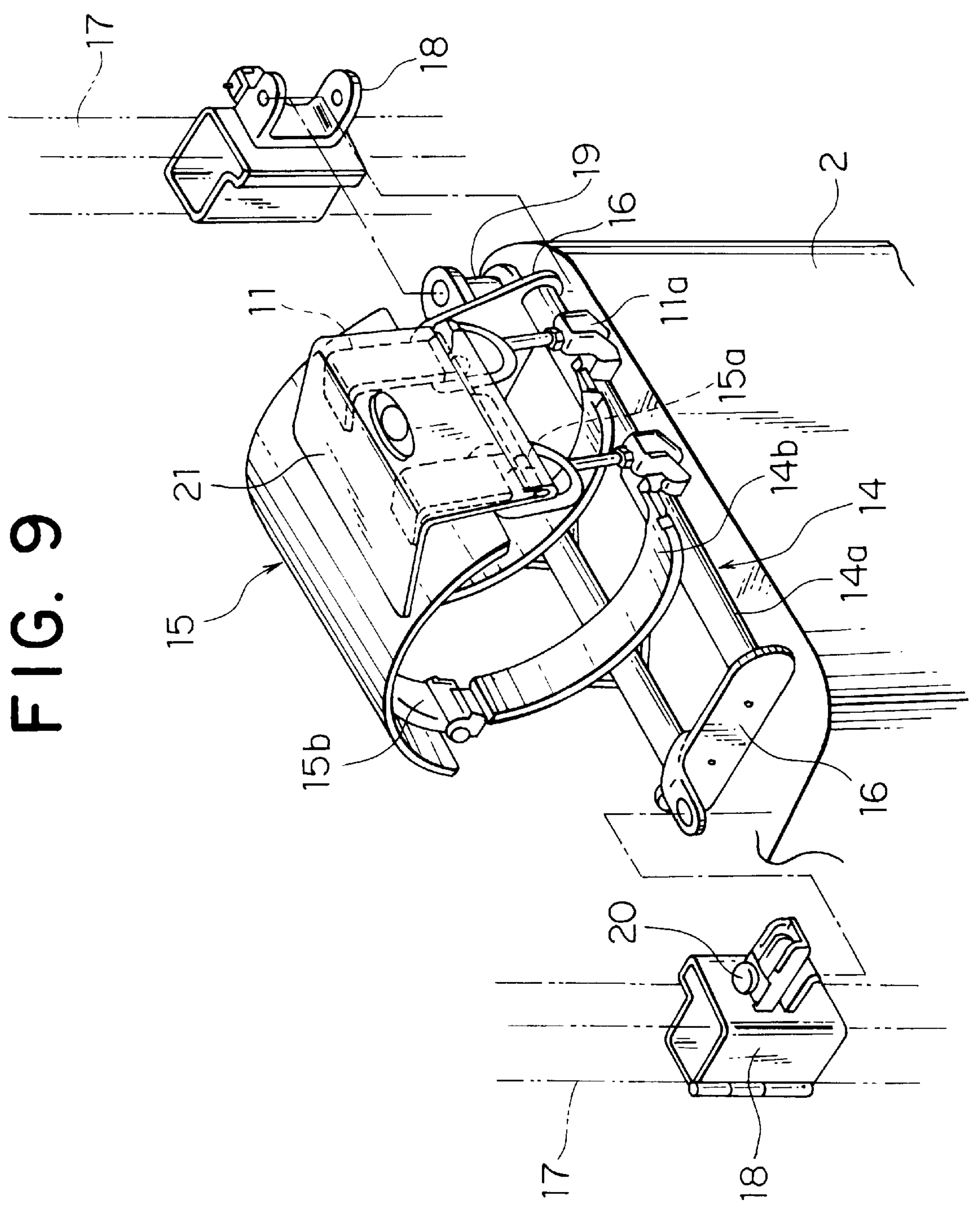

FIG. 9 shows a fourth embodiment of the present invention. According to this embodiment, in the swing type gas bomb holding apparatus to be mounted on the rear pillar 17, a number stay bracket 21 is attached to the arm member 15. A rear end face of the number stay bracket 21 is matched with an extension line of the rear end surface of the counterweight 2 to form a rear end indicating member.

Thus, in the third and fourth embodiments, like the first embodiment, the driver can confirm the rear end position of the counterweight 2 by using the bracket 16 or number stay bracket 21 which acts as the rear end indicating member at the same time, as a visual criterion during transportation work, to effectively carry out the transportation work. In this case, by disposing the bracket 16 or number stay bracket 21 which acts as the rear end indicating member slightly inside the rear end surface of the counterweight 2, the bracket 16 or 21 can be prevented from being damaged when the rear end of the forklift collides with a wall or the like.

In recent years, to enable a transportation work in such a narrow space as in a container, a forklift in which the counterweight 2 mounted on the rear thereof is extended upward and the length thereof is correspondingly reduced, has been proposed. Although this type of the forklift has an advantage in excellent turning capability, a driver's seat is relatively low relative to the top face of the counterweight 2, so that the backward view from the driver is further deteriorated when the gas bomb GB is mounted on the counterweight 2 in outside mounting style. However, by providing the rear end indicating member described in the above respective embodiments, the rear end position of the counterweight 2 can easily be confirmed. Thus, in transportation work in such a narrow space as in the container, the driver can effectively carry out the transportation work without making the rear end portion of the counterweight 2 interfere with a wall or goods.

What is claimed is:

1. A gas bomb holding apparatus for industrial vehicles comprising:

a holding device disposed on a rear portion of the industrial vehicle for holding a gas bomb such that it is laid, said holding device including a receiving stand for supporting the gas bomb and arm members rotatable mounted around a shaft in a cross direction of the vehicle for holding the gas bomb between said receiving stand and said arm members; and a rear end indicating member provided on said holding device to be visually confirmed by a driver for indicating a rear end position of the vehicle, said rear end indicating member being formed of an operating handle mounted on said arm members in a cross direction of the vehicle for rotating said arm members, wherein the driver can confirm the rear end position of the vehicle by means of said rear end indicating member.

2. A gas bomb holding apparatus according to claim 1 wherein the rear portion of the vehicle is formed of a counterweight, said rear end indicating member being located slightly forward of a rear end surface of said counterweight.

3. A gas bomb holding apparatus according to claim 1 wherein said shaft in the cross direction of the vehicle is provided on the rear portion of the vehicle and at the rear end thereof, said receiving stand and said arm members being rotatable in the back and forth direction around said shaft so as to be movable between a bomb holding position in which the gas bomb is located on the rear portion of the vehicle and a bomb replacement position which is located backward of the rear end surface of the vehicle and lower than the bomb holding position.

4. A gas bomb holding apparatus according to claim 3 wherein said arm members make contact with the rear end surface of the vehicle at the bomb replacement position.

5. A gas bomb holding apparatus for industrial vehicles comprising:

a holding device disposed on a rear portion of the industrial vehicle for holding a gas bomb such that it is laid, said holding device including a receiving stand for supporting the gas bomb and arm members rotatably mounted around a shaft in a cross direction of the vehicle for holding the gas bomb between said receiving stand and said arm members; and a rear end indicating member provided on said holding device to be visually confirmed by a driver for indicating a rear end position of the vehicle, said rear end indicating member being formed of an operating handle vertically mounted on said arm members for rotating said arm members, wherein the driver can confirm the rear end position of the vehicle by means of said rear end indicating member.

6. A gas bomb holding apparatus according to claim 5 wherein the rear portion of the vehicle is formed of a counterweight, said rear end indicating member being located slightly forward of a rear end surface of said counterweight.

7. A gas bomb holding apparatus according to claim 5 wherein said shaft in the cross direction of the vehicle is provided on the rear portion of the vehicle and at the rear end thereof, said receiving stand and said arm members being rotatable in the back and forth direction around said shaft so as to be movable between a bomb holding position in which the gas bomb is located on the rear portion of the vehicle and a bomb replacement position which is located backward of the rear end surface of the vehicle and lower than the bomb holding position.

8. A gas bomb holding apparatus according to claim 7 wherein said arm members make contact with the rear end surface of the vehicle at the bomb replacement position.

* * * * *